Feb. 6, 1923.
C. H. VEEDER
BEARING
Filed Feb. 16, 1921
Fig. 1.
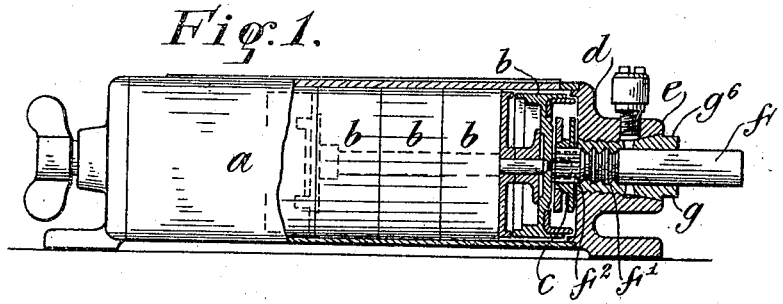
Fig. 2.
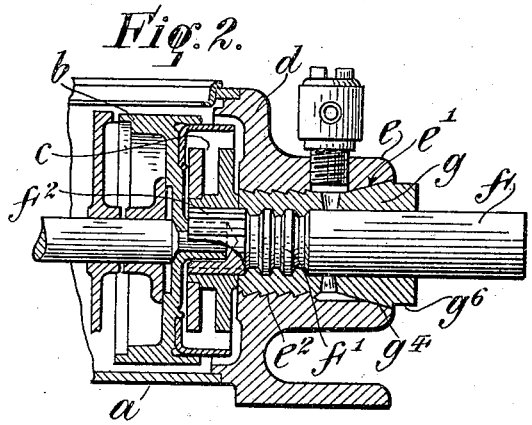
Fig. 3.
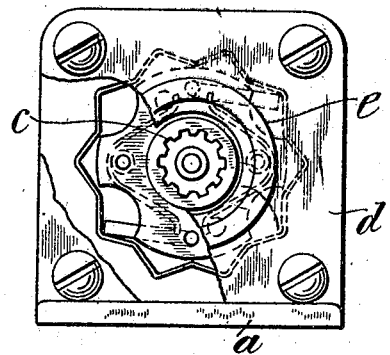
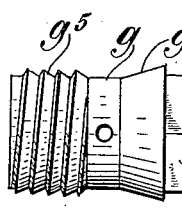
Fig. 4.
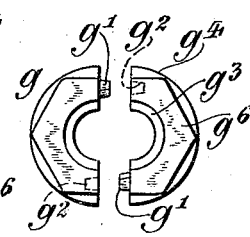
Fig. 5.
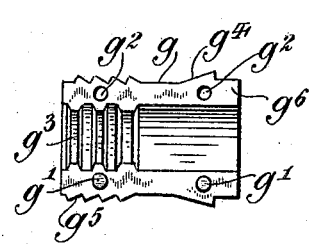
Fig. 6.
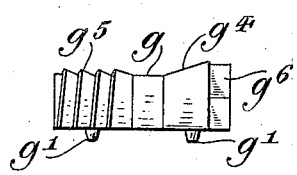
Fig. 7.
INVENTOR
Curtis Hussey Veeder
BY
Redding & Greeley
ATTORNEYS Patented Feb. 6, 1923.

1,444,765

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

BEARING.

Application filed February 16, 1921. Serial No. 445,335.

*To all whom it may concern:*

Be it known that I, CURTIS HUSSEY VEEDER, a citizen of the United States, residing in the city of Hartford, in the State of Connecticut, have invented certain new and useful Improvements in Bearings, of which the following is a specification, reference being had to the accompanying drawing, forming a part hereof.

This invention has been developed with particular reference to the bearings of the drive shafts of registers and it has for its object to reduce the cost of first construction, to facilitate renewal and repair and, by reason of the small size of the end thrust collars made possible to diminish friction as compared with the usual construction heretofore employed in which relatively large end thrust collars are provided on the drive shaft. In the particular use for which the improved bearing is primarily designed the parts are small, but it will be obvious that advantages of the improved bearing can be realized in structures of larger size and designed for other uses. In accordance with the invention the bushing, made in two equal longitudinal parts, is annularly grooved interiorly for coaction with the end thrust collars formed on the shaft, and is so formed exteriorly that the two parts are held rigidly in fixed relation when the bushing is seated within the supporting member. The invention will be explained more fully hereinafter with reference to the accompanying drawing in in which it is illustrated and in which—

Figure 1 is a view partly in elevation and partly in longitudinal section of a register, to the driving mechanism of which the improved bearing is applied.

Figure 2 is a partial view of the same, also in longitudinal section but on a larger scale.

Figure 3 is an end view of the register, as seen from the right hand in Figure 2, with the shaft and its bushing and the oil cup removed and parts broken away.

Figures 4, 5, 6 and 7 are detail views of the bushing.

In the embodiment and application of the invention shown in the drawing a register $a$, of ordinary construction, having number wheels $b$ and driving gearing $c$, has its casing end $d$ formed with a hub $e$ which constitutes the supporting member for the drive shaft $f$. The latter is formed with end thrust collars $f'$, and, in the construction shown, with multiple splines $f^2$ for co-operation with a pawl frame $c$. A bearing sleeve $g$, formed in two longitudinal parts, provided with pins $g'$ and corresponding sockets $g^2$, to insure accurate relation of the two parts when assembled, is grooved interiorly, as at $g^3$, for coaction with the end thrust collars $f'$ of the shaft $f$. Exteriorly the bushing is formed at one end with a conical contact surface $g^4$ and at the other end with a screw thread $g^5$ which is reversely conical with respect to the contact surface $g^4$. The bushing is also formed with a polygonal outer end $g^6$, for convenience in assembling. The supporting member $e$ is formed interiorly with a conical seat $e'$, for coaction with the conical contact surface $g^4$ of the bushing, and with a screw thread at $e^2$ for coaction with the screw thread $g^5$ of the bushing.

In assembling the improved bearing the two parts of the bushing $g$ are applied to the shaft $f$ and pressed together. The bushing, embracing the shaft, is then inserted within the supporting member $e$ and is screwed home. The coaction of the conical contact surface of the bushing with the conical seat $e'$ of the supporting member forces and holds the two parts of the bushing tightly together, assuring the perfect concentricity of the bushing with the shaft and the desired fit. The reversely conical threading of the bushing and supporting member in combination with the conical contact surfaces at the other end of the bushing serves to draw and hold the two parts of the bushing tightly together, compressing and holding the bushing in alignment at both ends.

I claim as my invention:

A shaft bearing comprising a bushing divided longitudinally and formed exteriorly with a conical contact surface and with a reversely conical thread and a supporting member formed interiorly with a conical seat for coaction with the conical contact portion of the bushing and with a reversely conical thread for coaction with the threaded portion of the bushing.

This specification signed this 9th day of February A. D. 1921.

CURTIS HUSSEY VEEDER.